United States Patent
Han et al.

(10) Patent No.: US 9,325,866 B2
(45) Date of Patent: Apr. 26, 2016

(54) IMAGE FORMING APPARATUS HAVING VARIOUS SETUP PARAMETERS BEING USED BY A MOBILE TERMINAL CARRIED BY A USER AND METHOD FOR CONTROLLING THE SAME

(71) Applicant: SAMSUNG ELECTRONICS CO., LTD., Suwon-si, Gyeonggi-do (KR)

(72) Inventors: Jae Hee Han, Suwon-si (KR); Chun Sub Ryu, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/567,109

(22) Filed: Dec. 11, 2014

(65) Prior Publication Data

US 2015/0249757 A1    Sep. 3, 2015

(30) Foreign Application Priority Data

Mar. 3, 2014    (KR) ........................ 10-2014-0025181

(51) Int. Cl.
| | |
|---|---|
| *G06F 3/12* | (2006.01) |
| *H04N 1/00* | (2006.01) |
| *H04N 1/21* | (2006.01) |
| *H04N 1/32* | (2006.01) |

(52) U.S. Cl.
CPC ....... *H04N 1/00307* (2013.01); *H04N 1/00411* (2013.01); *H04N 1/00912* (2013.01); *H04N 1/21* (2013.01); *H04N 1/32106* (2013.01); *H04N 2201/0082* (2013.01); *H04N 2201/0093* (2013.01); *H04N 2201/0094* (2013.01)

(58) Field of Classification Search
CPC .......... H04N 1/00307; H04N 1/00411; H04N 1/00912; H04N 1/21; H04N 1/32106; H04N 2201/0082; H04N 2201/0093; H04N 2201/0094
USPC .............................. 358/1.13, 1.14, 1.15, 1.16
See application file for complete search history.

(56) References Cited

U.S. PATENT DOCUMENTS

| | | | |
|---|---|---|---|
| 8,873,098 B2* | 10/2014 | Kyoda et al. ................. | 358/1.15 |
| 2006/0031942 A1* | 2/2006 | Jones et al. ..................... | 726/27 |
| 2008/0048998 A1* | 2/2008 | Yamauchi et al. ............ | 345/204 |
| 2009/0009797 A1* | 1/2009 | Nimura et al. ............... | 358/1.15 |
| 2013/0033716 A1* | 2/2013 | Suese ........................... | 358/1.13 |

FOREIGN PATENT DOCUMENTS

JP    2007-274268    10/2007

* cited by examiner

*Primary Examiner* — Gabriel Garcia
(74) *Attorney, Agent, or Firm* — Staas & Halsey LLP

(57) ABSTRACT

An image forming apparatus and method are provided. The image forming apparatus includes an image forming unit to form an image on a recording medium, a communication unit to receive setup information related to an image forming operation from a mobile terminal, a storage unit to store data related to the image forming operation; and a controller to determine a user authority on the basis of identifier (ID) information of the mobile terminal and to store at least some parts from among the received setup information in the storage unit according to the determined user authority. The image forming apparatus receives setup information stored in the user's mobile terminal through a near field communication (NFC) scheme, such that the user can easily and quickly change setup information of the image forming apparatus.

15 Claims, 13 Drawing Sheets

Change display language

IMAGE FORMING APPARATUS HAVING VARIOUS SETUP PARAMETERS BEING USED BY A MOBILE TERMINAL CARRIED BY A USER AND METHOD FOR CONTROLLING THE SAME

CROSS-REFERENCE TO RELATED APPLICATIONS

This application is related to, and claims the priority benefit of, Korean Patent Application No. 10-2014-0025181, filed on Mar. 3, 2014 in the Korean Intellectual Property Office, the disclosure of which is incorporated herein by reference.

BACKGROUND

1. Field

Embodiments disclosed herein relate to an image forming apparatus and a method for controlling the same, which can establish options related to an image forming operation using a mobile terminal carried by a user.

2. Description of the Related Art

Image forming apparatuses print an image on a printing medium such as paper. Examples of image forming apparatuses include printers, copiers, facsimiles, and so-called multifunctional apparatuses that combine all, or some of, the functionalities of the aforementioned devices.

The image forming apparatuses can be classified, according to a printing method thereof, into inkjet image forming apparatuses and electrophotographic image forming apparatuses. The inkjet image forming apparatuses may be adapted to print an image by discharging fine droplets of ink onto a printing medium at desired positions. The electrophotographic image forming apparatuses supply toner to electrostatic latent images formed by irradiating light to the photoconductors, the electrostatic latent image is transferred to a printing medium, resulting in completion of image formation.

The image forming apparatus can be established in various ways according to a user request. For example, various setup parameters for recording-medium type, recording-medium size, image quality, image tone, etc. can be established. Such various setup parameters may be changed using a user interface (UI).

If a user is not accustomed to using the user interface (UI) of the image forming apparatus, or if language used by the user is different from a language displayed on the user interface (UI), the user may have difficulty in changing various setup parameters related to the image forming operation.

SUMMARY

It is an aspect of the disclosure to provide an image forming apparatus for receiving setup information related to an image forming operation through a mobile terminal carried by a user, and a method for controlling the same.

It is an aspect of the disclosure to provide an image forming apparatus configured to limit changeable setup information according to user authority so as to prevent the occurrence of malfunction caused by change of the principal setup information.

Additional aspects of the disclosure will be set forth in part in the description which follows and, in part, will be obvious from the description, or may be learned by practice of the disclosure.

In accordance with an aspect of the disclosure, an image forming apparatus includes a storage unit to store a first storage region storing first setup information and a second storage region storing second setup information, a communication unit to receive at least one of the first setup information and the second setup information from a mobile terminal; and a controller to change the first setup information and the second setup information stored in the storage unit when a user class determined on a basis of identifier (ID) information of the mobile terminal determined as a first class, and to change the second setup information stored in the storage unit when the user class is determined as a second class.

The first storage region may store an initial value of the first setup information and an initial value of the second setup information.

The first storage region may be comprised of a non-volatile memory, and the second storage region may be comprised of a volatile memory.

The first setup information may include at least one of data information, time information, and country information. The second setup information may include at least one of display language information, recording-medium type information, recording-medium size information, image quality information, and image tone.

If a control command is not entered by the user within a reference time duration after reception of the first or second setup information, the controller may initialize the second setup information stored in the storage unit.

The communication unit may include a first communication module to directly communicate with the mobile terminal, and a second communication module to communicate with the mobile terminal through a communication network.

If the mobile terminal is tagged, the first communication module may receive at least one of ID information of the mobile terminal, the first setup information, and the second setup information.

If the mobile terminal is tagged, the first communication module may transmit access information to the mobile terminal, and if the mobile terminal connects to the communication network, the second communication module may receive at least one of ID information of the mobile terminal, the first setup information, and the second setup information.

In accordance with an aspect of the disclosure, an image forming apparatus includes a user interface (UI) to receive a control command from a user, and to display operation information corresponding to the control command, a storage unit to store display language setup information of the user interface (UI), a communication unit to receive the display language setup information from the mobile terminal, and a controller to change language displayed on the user interface (UI) according to the display language setup information received from the communication unit.

The controller may change the display language setup information stored in the storage unit according to the display language setup information received by the communication unit.

If a control command is not entered by the user within a reference time duration after the language displayed on the user interface is changed, the controller may recover the language displayed on the user interface.

In accordance with an aspect of the disclosure, an image forming apparatus includes: a storage unit to store setup information related to operations of the image forming apparatus therein; a communication unit to communicate with the mobile terminal, and a controller to determine whether the setup information is changeable according to user authority determined on the basis of identifier (ID) information of the mobile terminal, to control the communication unit to transmit the changeable setup information to the mobile terminal, and to change the setup information stored in the storage unit according to the setup information received by the communication unit.

The setup information may include first setup information and second setup information, wherein the first setup information is changeable when the user authority indicates an administrator.

If the user authority indicates the administrator, the controller may control the communication unit to transmit a list of the first setup information and the second setup information to the mobile terminal.

If the user authority does not indicate the administrator, the controller may control the communication unit to transmit a list of the second setup information to the mobile terminal.

In accordance with an aspect of the disclosure, a method for controlling an image forming apparatus includes receiving at least one of first setup information and second setup information from a mobile terminal, determining a class of a user authority on the basis of identifier (ID) information of the mobile terminal, storing the at least one setup information when the user authority class is at a first class, and storing the second setup information when the user authority class is a second class.

The method may include if a control command is not entered by the user within a reference time duration after reception of the first or second setup information, initializing the second setup information.

The receiving of the at least one setup information may include: if the mobile terminal is tagged, receiving at least one of ID information of the mobile terminal, the first setup information, and the second setup information.

In accordance with an aspect of the disclosure, a method for controlling an image forming apparatus includes receiving identifier (ID) information of a mobile terminal from the mobile terminal, determining a class of a user authority on the basis of identifier (ID) information of the mobile terminal, determining setup information changeable in response to the user authority, transmitting a list of the changeable setup information to the mobile terminal; and receiving the changeable setup information from the mobile terminal.

The transmitting of the changeable setup information to the mobile terminal may include: if the user authority indicates an administrator, transmitting a list of first setup information and second setup information to the mobile terminal.

The transmitting of the changeable setup information to the mobile terminal may include: if the user authority does not indicate the administrator, transmitting a list of the second setup information to the mobile terminal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
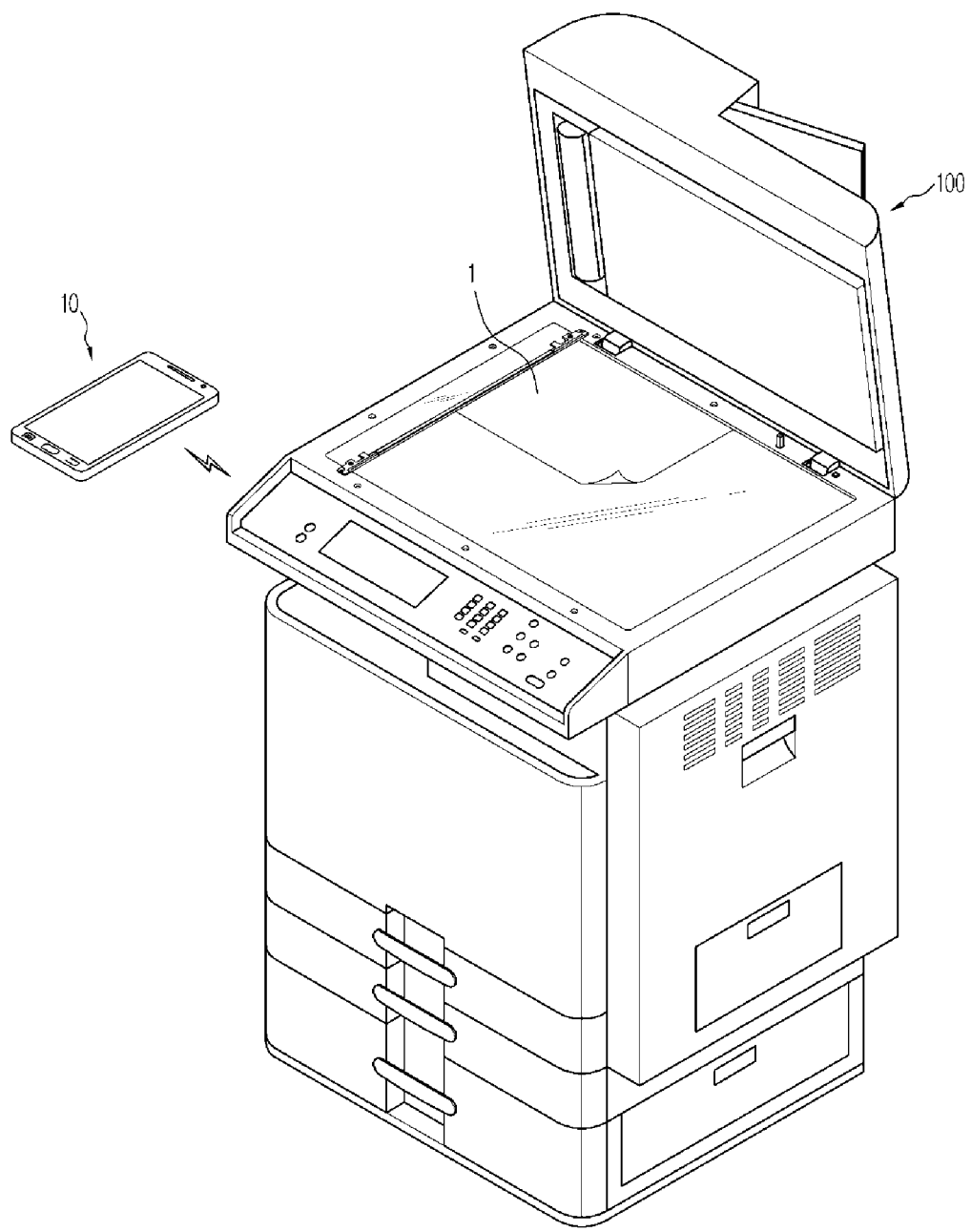
FIG. 1 illustrates an image forming apparatus according to an exemplary embodiment of the disclosure.

Reference will now be made in detail to the embodiments of the disclosure, examples of which are illustrated in the accompanying drawings, wherein like reference numerals refer to like elements throughout.

An image forming apparatus and a method for controlling the same according to the embodiments of the disclosure is described with reference to the attached drawings.

FIG. 1 illustrates an image forming apparatus according to an exemplary embodiment.

The image forming apparatus 100 according to the embodiment obtains an image of a sheet of paper 1, and forms a specific image corresponding to the image obtained on a recording medium.

The image forming apparatus 100 may be implemented as a copier, a scanner, a facsimile, a multifunctional machine, etc. for obtaining an image of a sheet of paper 1 and forming the image on a recording medium 2.

The image forming apparatus 100 receives setup information related to the image forming operation from the mobile terminal 10, and operates in response to the setup information received from the mobile terminal 10.

For example, the mobile terminal 10 may store language-related setup information (e.g., English, French, German, Chinese or Korean) related to language displayed on a display of the image forming apparatus 100, and transmit language-related setup information to the image forming apparatus 100.

Upon receiving the language-related setup information from the mobile terminal 10, the image forming apparatus 100 may change language displayed on the received language-related setup information.

In other words, a user may store information related to the operation of the image forming apparatus 100 in the mobile terminal 10, and change setup information related to the operation of the image forming apparatus 100 through the mobile terminal 10.

The image forming apparatus 10 is described in detail.

Figure 2:
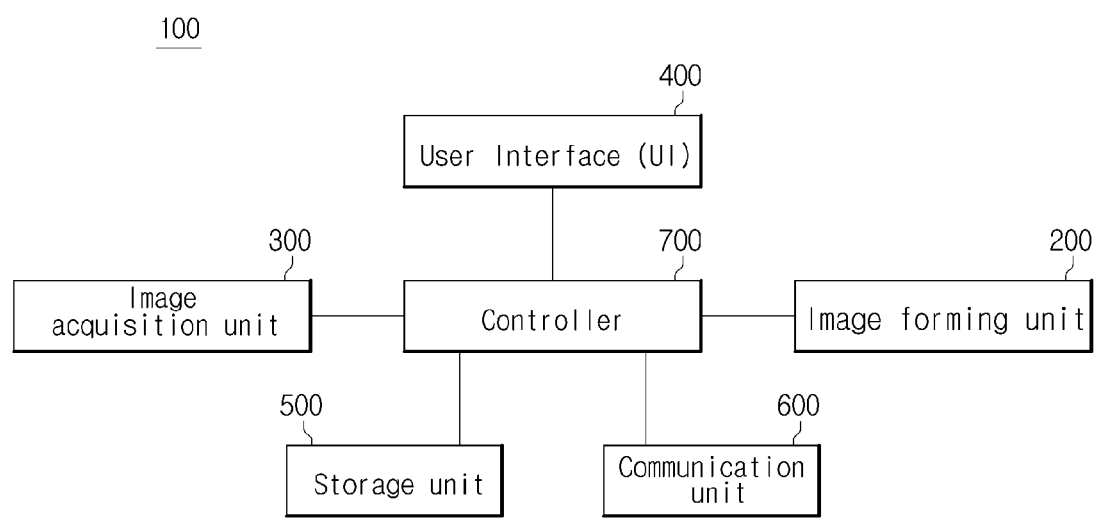
FIG. 2 is a block diagram illustrating an image forming apparatus according to an exemplary embodiment of the disclosure.
Figure 3:
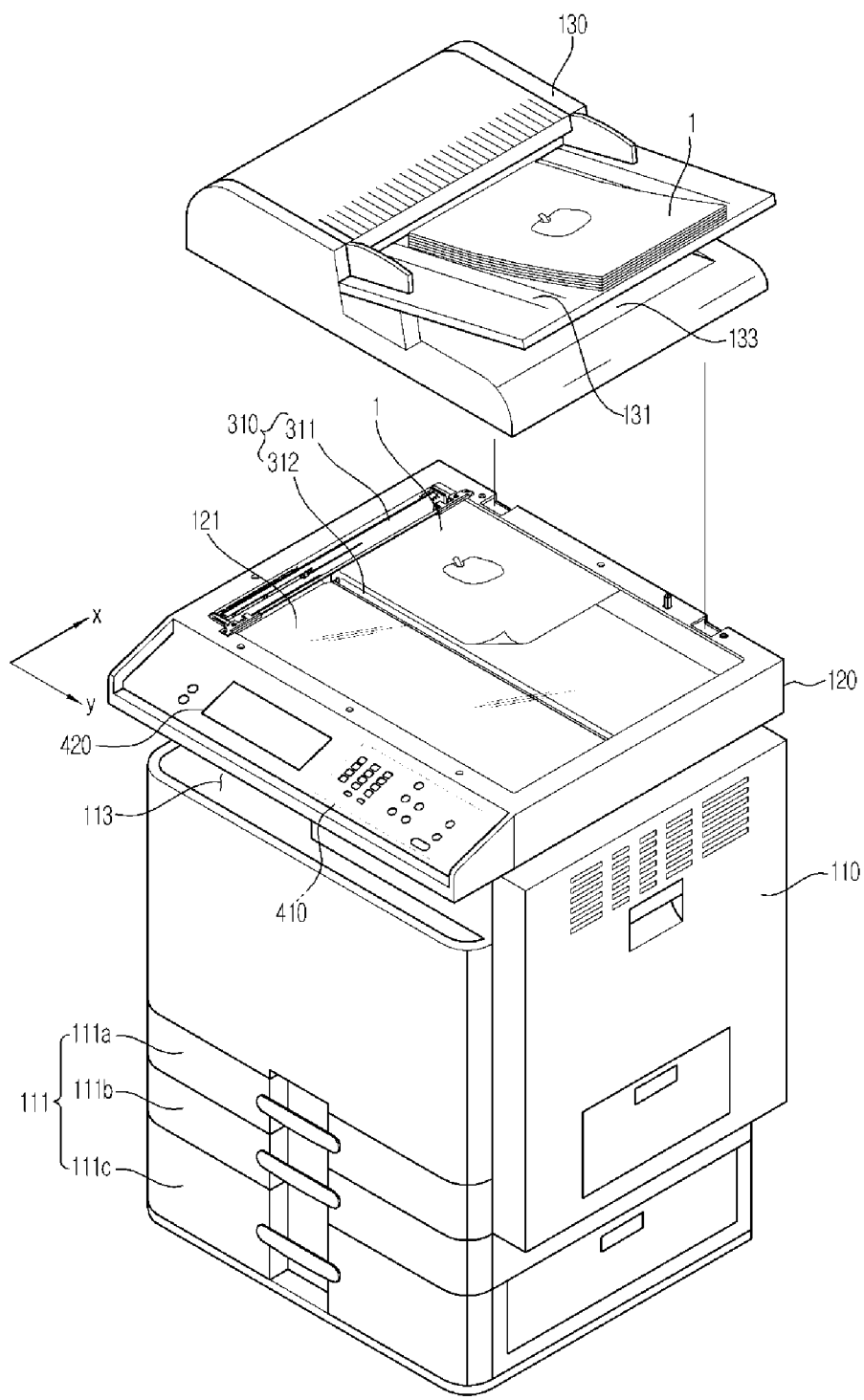
FIG. 3 illustrates an image forming apparatus according to an exemplary embodiment of the disclosure.

FIG. 2 is a block diagram illustrating an image forming apparatus in an image forming system according to an embodiment of the disclosure. FIG. 3 illustrates the appearance of the image forming apparatus included in the image forming apparatus according to an embodiment of the disclosure.

Figure 4:
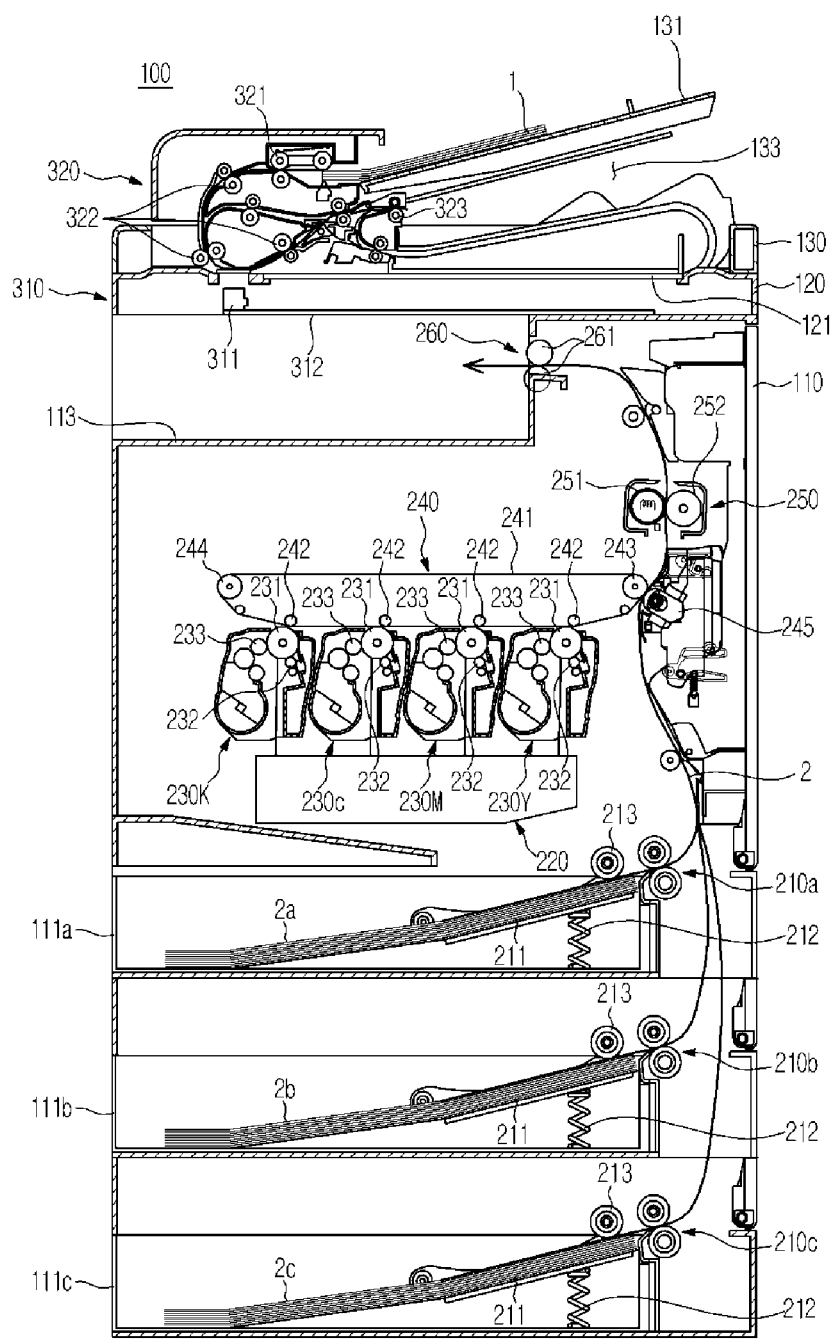
FIG. 4 illustrates an image forming unit and an image acquisition unit in the image forming apparatus according to an exemplary embodiment of the disclosure.
Figure 5:
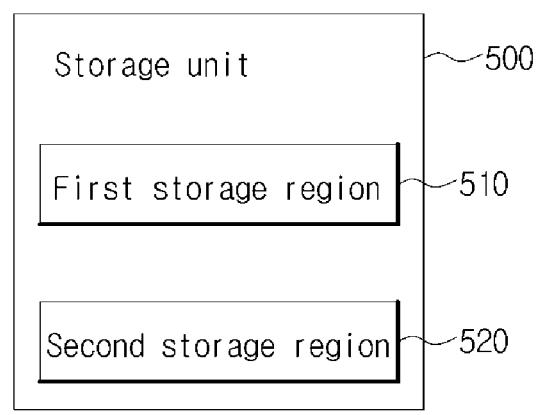
FIG. 5 is a block diagram illustrating a storage unit in the image forming apparatus according to an exemplary embodiment of the disclosure.
Figure 6:
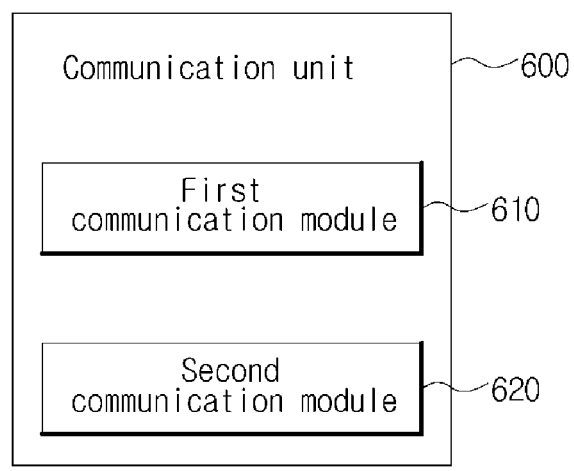
FIG. 6 is a block diagram illustrating a communication unit in the image forming apparatus according to an exemplary embodiment of the disclosure.

FIG. 4 illustrates an image forming unit and an image acquisition unit included in the image forming apparatus according to an embodiment of the disclosure. FIG. 5 is a block diagram illustrating a storage unit included in the image forming apparatus according to an embodiment of the disclosure. FIG. 6 is a block diagram illustrating a communication unit included in the image forming apparatus according to an embodiment of the disclosure.

Referring to FIGS. 2 to 6, the image forming apparatus 100 includes an image forming unit 200 to form an image on a recording medium 2, an image acquisition unit 300 to obtain an image of a sheet of paper 1, a user interface 400 to interact with the user, a storage unit 500 to store a program and data, a communication unit 600 to communicate with the mobile terminal 10, and a controller 700 to control the image forming apparatus 100.

The image forming unit 200 may form the image received from the controller 700 on the recording medium 2.

The image forming unit 200 may be included in a main body 100 for forming the principal appearance of the image forming apparatus 100. The image forming apparatus 200 may pick up the recording medium 2 received in a paper tray 111, may form an image on the picked-up recording medium, and may discharge the recording medium 2 to a paper discharge tray 113.

The image forming apparatus 200 may include a paper feeding unit 210, an exposure unit 220, a developing unit 230, a transfer unit 240, a fusing unit 250, and a paper discharge unit 260.

The paper feeding unit 210 (210a, 210b, 210c) may pick up the recording medium 2 from a plurality of paper trays 111 (111a, 111b, 111c) storing different recording media 2 (2a, 2b, 2c), and deliver the picked-up recording medium 2 to the transfer unit 240.

For example, the paper feeding unit 210 may include a first paper feeding unit 210a to pick up a first recording medium 2a from the first paper tray 111a, a second paper feeding unit 210b to pick up a second recording medium 2b from the second paper tray 111b, and a third paper feeding unit 210c to pick up a third recording medium 2c from the third paper tray 210c.

Each paper feeding unit (210a, 210b or 210c) may include a pickup plate 211 on which the recording medium 2 is seated, a pickup spring 212 for elastically supporting the pickup plate 211, and a pickup roller 213 to pick up the recording medium 2 seated on the pickup plate 211.

The exposure unit 220 may irradiate light corresponding to either the image of the sheet 1 obtained by the image acquisition unit 300 or the image received through the communication unit 600. The exposure unit 220 may include a Laser Scanning Unit (LSU) or an LED Print Head (LPH).

The laser scanning unit may include a light source configured to emit light and a reflective mirror configured to rotate by a motor. The light irradiated from the light source is reflected from the rotating reflective mirror, such that the light is irradiated on a photoconductive drum 161. The LED print head (LPH) may include an LED array, and each LED included in the LED array may directly irradiate or generate light.

The developing unit 2230 may develop an electrostatic latent image formed by light irradiated from the exposure unit 220.

For example, the developing unit 230 may include a first developing unit 230K to develop an electrostatic latent image using a black toner, a second developing unit 230C to develop an electrostatic latent image using a cyan toner, a third developing unit 230M to develop an electrostatic latent image using a magenta toner, and a fourth developing unit 230Y to develop an electrostatic latent image using a yellow toner.

Each developing unit (230K, 230C, 230M, or 230Y) may include a photoconductive drum 231 on which an electrostatic latent image caused by light is formed, a charge roller 232 for charging the outer circumference of the photoconductive drum 231, and a developing roller 233 to develop an electrostatic latent image using toners.

The developing process caused by rotation of the photoconductive drum 221 is described in detail. The charge roller may charge the outer circumference of the photoconductive drum 221.

Thereafter, light irradiated by the exposure unit 220 may be irradiated onto the outer circumference of the photoconductive drum 231. A photoconductive material may be applied to the outer circumference of the photoconductive drum 231, and an electrostatic latent image is formed on the outer circumference of the photoconductive drum 231 by the light irradiated from the exposure unit 220. In other words, an image caused by charges is formed on the outer circumference of the photoconductive drum 231.

Thereafter, a charged toner may be provided to the outer circumference of the photoconductive drum 231. As a result, the charged toner may be attached to the electrostatic latent image formed on the outer circumference of the photoconductive drum 231, and an electrostatic latent image of the outer circumference of the photoconductive drum 231 is developed. In other words, a toner image is formed on the outer circumference of the photoconductive drum 231 by the charged toner. In other words, an image caused by the toner is formed on the outer circumference of the photoconductive drum 231.

The transfer unit 230 may transfer the toner image onto the recording medium 2 delivered by the paper feeding unit 210.

The transfer unit 240 may include a transfer belt 241 to deliver a toner image to the recording medium 231, a first transfer roller 242 to transfer the toner image formed on the photoconductive drum 231 to the photoconductive drum 231, a drive roller 243 to rotate the transfer belt 241, a tension roller 244 to maintain a constant tension of the transfer belt 241, and a second transfer roller 245 to transfer the toner image transferred to the transfer belt 241 onto the recording medium 2.

The transfer process caused by rotation of the transfer belt 241 is described in detail. A black toner image from the first developing unit 230K is transferred to the transfer belt 241.

In case of a color mode, a magenta toner image from the second developing unit 230C is transferred to the transfer belt 241. A cyan toner image from the third developing unit 230M is transferred to the transfer belt 241, and a yellow toner image from the fourth developing unit 230Y is transferred to the transfer belt 241. The black toner image, the magenta toner image, the cyan toner image, and the yellow toner image are combined so that a colored toner image is formed on the transfer belt 241.

Thereafter, the color toner image may be transferred to the recording medium 2 by the second transfer roller 245.

In case of a monochrome mode (i.e., a black-and-white mode), the black toner image is transferred to the recording medium 2 by the second transfer roller 245.

The fusing unit 250 may fuse the transferred toner image onto the recording medium 2 through heat and pressure, and may include a heating roller 251 to heat the recording medium 2 onto which the transferred image has been transferred and a pressure roller 252 to press the recording medium 2 onto which the toner image has been transferred.

The paper discharge unit 260 may include a discharge roller 251 to discharge the recording medium 2 to which the toner image is fused to the discharge tray 113 formed above the main body 110. The image acquisition unit 300 may include a scanner 310 to obtain a two-dimensional (2D) image of the sheet 1.

The scanner 310 may be included in a sub-body 120 located above the main body 119. In more detail, a transparent flatbed 121 is provided above the sub-body 120, and the scanner 310 may obtain an image of the paper 1 located above the flatbed 121.

The scanner may include an optical sensor module 311 which irradiates light to the paper 1 while in motion and receives the light reflected from the paper 1, and a guide rail 312 which guides movement of the optical sensor module 311.

For example, the optical sensor module 311 may be extended in an X-axis direction, and the guide rail 312 may be extended in a Y-axis direction. The optical sensor module 311 extended in the X-axis direction may move along the guide rail 312 extended in the Y-axis direction, and the scanner 310 may obtain a two-dimensional (2D) image of the paper 1.

The image acquisition unit 300 may include an Auto Document Feeder (ADF) 320 which selectively and automatically feeds the paper 1 to the scanner 310.

The ADF 320 may be provided at a flatbed cover 130 covering the flatbed 121. The ADF 320 may pick up the paper 1 seated in a document tray 131, expose the picked-up paper to the optical sensor module 311 of the scanner 320, and discharge the exposed paper to a paper discharge tray 133.

The ADF 320 may include a pickup roller 321 to pick up paper 1 located on the paper tray 131, a transfer roller 322 to deliver the picked-up paper 1 toward the scanner 310, and a discharge roller 323 to discharge the scanned paper 1.

If the paper 1 is inserted into the ADF 320 so that an image of the paper 1 is obtained, the optical sensor module 311 of the scanner 310 does not move along the guide rail 312. That is, while the paper 1 is delivered by a paper conveying roller 322, the image of the paper 1 is exposed to the optical sensor module 311, so that the optical sensor module 311 can obtain a two-dimensional (2D) image of the paper 1 without movement.

A user interface (UI) 400 may include a plurality of input buttons to receive a control command from a user, and a display 420 to display operation information of the image forming apparatus 100.

For example, the plurality of input buttons 410 may include a power button for providing or blocking power, an operation button for performing a copying or scanning operation, number keys for entering numbers, etc.

The display 420 may include a liquid crystal display (LCD) panel, a light emitting diode (LED) panel or an organic light emitting diode (OLED) panel to display operation information of the image forming apparatus 100.

The display 420 may include a touch screen panel (TSP) capable of sensing contact of some parts of a user body.

For example, a touch screen panel (TSP) may include a touch pad configured to sense contact of a user who touches a display panel such as the LCD or OLED panel. The TSP may sense user contact, detect coordinates at which user contact is detected, and provide the detected coordinates to the controller 700. The controller 700 may recognize a control command corresponding to the detected coordinates.

The storage unit 500 may include a plurality of storage regions according to contents of the stored information.

For example, as illustrated in FIG. 5, the storage unit 500 may include a first storage region 510 and a second storage region 520.

The first storage region 510 may store programs and data required to operate the image forming apparatus 100, an initial value of setup information related to the operation of the image forming apparatus 100, and first setup information related to the operation of the image forming apparatus 100.

The second storage region 510 may store temporary data generated when the image forming apparatus 100 is controlled, and may store second setup information related to the operation of the image forming apparatus 100.

The first setup information may indicate setup information (e.g., data, time, country, etc.) to be used as the principal parameter related to the operation of the image forming apparatus 100, and may be changed by a person (hereinafter referred to as an administrator) who has special authority to manage the image forming apparatus 100. In contrast, the second setup information may indicate setup information related to general operations of the image forming apparatus 100, for example, a display language, a color mode of an image, a recording-medium type, a recording-medium size, an image quality, an image tone, etc. The second setup information may be changed by a user who can use the image forming apparatus 100. The first setup information may affect the second setup information. For example, if country-related setup information is changed from Korea to the United States of America, the image forming apparatus 100 changes the country-related setup information to the United States of America, and changes the language-related setup information from Korean to English.

According to an embodiment, an administrator may change first setup information stored in a first storage region 510 and second setup information stored in a second storage region 520, and a user (hereinafter referred to as a guest) other than the administrator may change only the second setup information stored in the second storage region 520.

The image forming apparatus 100 may determine a user class (indicating whether the user is an administrator or a guest), for example, through ID information of the mobile terminal 10 carried by the user. If the first setup information needs to be changed, a password of the administrator may be entered.

Although the user class according to an embodiment is classified into two classes (i.e., administrator and guest), the scope or spirit of the disclosure is not limited thereto, and the user class may be classified into two or more classes. The setup information may be classified into three or more classes.

The storage unit 500 may include a non-transitory non-volatile memory, such as a magnetic disk or a solid state disk, to permanently store data therein, and a volatile memory, such as a DRAM or SRAM, to temporarily store data therein. For example, the first storage region 510 in which the first setup information is stored may be implemented as a non-volatile memory, and the second storage region 520 in which the second setup information is stored may be implemented as a volatile memory.

The communication unit 600 may include a first communication module 610 to directly communicate with an external device, and a second communication module 620 to communicate with the external device through a communication network.

The first communication module 610 may directly communicate with the external device over a short range. In other words, the first communication module 610 may directly communicate with the external device on a one to one basis.

For example, the first communication module 610 may include a Near Field Communication (NFC) module having a communication distance of about 10 cm, and a Bluetooth communication module having a communication distance of 10 m to 100 m.

The NFC module has a short communication distance so that communication security can be guaranteed. The pairing operation is not requested, so that communication can be initiated within a short period of time. Thus, according to an exemplary embodiment, the first communication module 610 includes an NFC module.

The NFC module may be classified into an active-type communication module (hereinafter referred to as an active tag) which self-generates an electromagnetic field and actively communicates with the external device, and a passive-type communication module (hereinafter referred to as a passive tag) which provides data to the external device upon receiving an electromagnetic field from the external device and records data received from the external device.

The active tag may operate in any one of a card emulation mode, a read/write mode, and a peer-to-peer mode. In the card emulation mode, the passive tag cannot autonomously generate the electromagnetic field. In the read/write mode, if the active tag communicates with the passive tag of the external device, this active tag receives data from the external device and records the data in the passive tag of the external device. In the peer-to-peer mode, if the active tag communicates with an active tag of the external device, the active tag can transmit/receive data to/from the external device.

If the first communication module 610 includes the passive tag, the image forming apparatus 100 may store ID information such as a MAC address and access information such as a pin code in the passive tag. If the first communication module 610 communicates with the external device, the first communication module 610 may provide ID information and access information of the image forming apparatus 100.

For example, if the image forming apparatus 100 including the passive tag communicates with the mobile terminal 10, the mobile terminal may acquire ID information and access information of the image forming apparatus 100 from the passive tag. Thereafter, the mobile terminal 10 may identify the image forming apparatus on a local area network (LAN) to be described on the basis of the acquired ID information. The mobile terminal 10 may authenticate whether or not the corresponding user is valid on the basis of the access information received from the image forming apparatus 100, and may communicate with the image forming apparatus 100.

If the first communication module 610 includes the active tag, the image forming apparatus 100 may directly communicate with the external device through the active tag.

For example, if the image forming apparatus 100 including the active tag communicates with the mobile terminal 10, the image forming apparatus 100 may communicate with the mobile terminal 10 through the active tag.

The second communication module 620 may communicate with the external device through a local area network (LAN). In other words, the second communication module 620 may communicate with the external device by connecting to a communication network between a plurality of external devices. For example, the second communication module 620 may include a Local Area Network (LAN) communication module, a Wireless Local Area Network (WLAN) or Wireless Fidelity (Wi-Fi) communication module, a ZigBee communication module, etc.

The controller 700 may control the operation of the image forming apparatus 100.

The controller 700 may recognize a user control command entered through the user interface (UI) 400, and may control the user interface 400 to display operation information of the image forming apparatus 100.

The controller 700 may control the image acquisition unit 300 to obtain image information of the paper 1, and may control the image forming unit 400 to form an image corresponding to image information obtained from the recording medium 2.

The controller 700 may manage data stored in the storage unit 500, and control the communication unit 600 to communicate with the external device.

In addition, upon receiving a request for changing setup information through the communication unit 600, the controller 700 may confirm ID information of the mobile terminal 10, and determine a user class on the basis of the confirmed ID information.

Upon receiving the first setup information or the second setup information according to the determined user class, the controller 700 may store the first setup information or the second setup information in the first storage region 510 or the second storage region 520 of the storage unit 500.

The controller 700 may include one microprocessor or two or more microprocessors to perform calculation, for example, according to the program and data stored in the storage unit 500.

Figure 7:
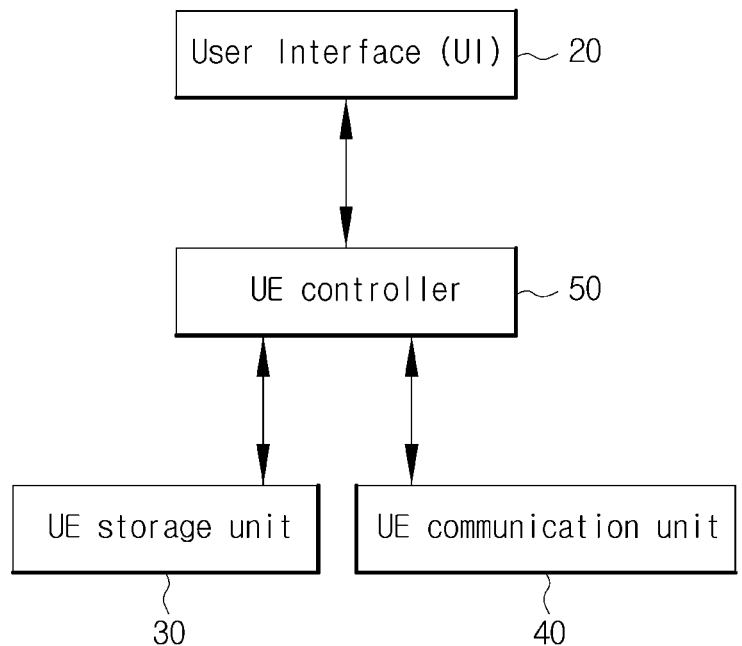
FIG. 7 is a block diagram illustrating a mobile terminal.

FIG. 7 is a block diagram illustrating an exemplary mobile terminal.

The mobile terminal 10 may have mobility, and may be referred to as a User Equipment (UE).

Referring to FIG. 7, the mobile terminal 10 may include a user equipment (UE) interface 20, a UE storage unit 30, a UE communication unit 40, and a UE controller 50.

The UE interface 20 may include an input button to receive a control command from a user, and a display to display operation information depending on a control command of the user. The UE interface 20 may include a touch screen panel for receiving a control command in response to user contact and displaying information corresponding to the control command.

The UE interface 20 may receive the first setup information or the second setup information of the image forming apparatus 100 from the user.

The UE storage unit 30 may include a non-transistory non-volatile memory, such as a magnetic disc or a solid state disc, to permanently store a control program and control data for controlling the mobile terminal 10 therein, and a volatile memory, such as a DRAM or SRAM, for temporarily storing data generated when the mobile terminal 10 is controlled.

The UE communication unit 40 may include a direct communication module to directly communicate with an external device over a short range, a local area network (LAN) communication module to communicate with the external device through a local area network (LAN), and a wide area network (WAN) communication module to communicate with the external device through a WAN.

The direct communication module may directly communicate with an external device located in a local area through an NFC or Bluetooth communication scheme, etc. The LAN communication module may communicate with the external device accessing the LAN using a WiFi communication scheme or a ZigBee communication scheme, etc.

The WAN communication module may communicate with a wide-area external device using various communication schemes, for example, Time Division Multiple Access (TDMA), Code Division Multiple Access (CDMA), Wide Code Division Multiple Access (WCDMA), Wireless Broadband (Wibro), World Interoperability for Microwave Access (WiMAX), Long Term Evolution (LTE), etc.

The UE controller 50 may control overall operations of the mobile terminal 10. The UE controller 50 may recognize a user control command entered through the UE interface 20, and may output operation information of the mobile terminal 10 through the UE interface 20. The UE controller 50 may manage data stored in the UE storage unit 30, and communicate with the external device through the UE communication unit 40.

The mobile terminal and the image forming apparatus according to an embodiment are disclosed herein.

The operations of the mobile terminal and the image forming apparatus according to an embodiment are described in detail.

If the user interface (UI) of the image forming apparatus is different from a user interface (UI) for a user, the user may have difficulty in changing setup information of the image forming apparatus.

For example, if a user interface (UI) of the new image forming apparatus is different from that of the conventional image forming apparatus, the user may have difficulty in changing setup information of the new image forming apparatus.

As an example, if the language of the user interface (UI) is set to Korean, a foreigner who is unable to recognize or speak Korean may have difficulty in changing setup information of the image forming apparatus.

To address the problem, the user may store setup information of the image forming apparatus 100 in their mobile terminal 10, and may transmit setup information stored in the mobile terminal 10 to the image forming apparatus 100 through communication between the mobile terminal 10 and the image forming apparatus 100.

Figure 8:
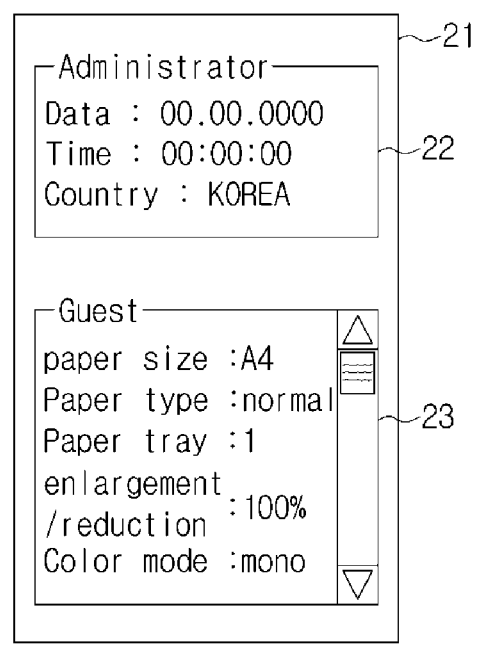
FIG. 8 illustrates an exemplary screen image displayed on a user equipment (UE) interface of a mobile terminal.

FIG. 8 illustrates an exemplary screen image displayed on a UE interface of the mobile terminal.

Referring to FIG. 8, the mobile terminal 10 may display an exemplary screen for receiving setup information of the image forming apparatus 100 on the UE interface 20 (See, for example, FIG. 7).

For example, the mobile terminal 10 may display a setup information screen image 21 illustrated in FIG. 8.

The setup information screen 21 may include a first setup information region 22 and a second setup information region 23. The first setup information region 22 displays first setup information of the image forming apparatus 100 and receives first setup information from the user. The second setup information region 23 may display second setup information of the image forming apparatus 100, and receive second setup information from the user. However, if the user has a guest class, the setup information screen 210 may include only the second setup information region 23.

The mobile terminal 10 may deactivate some items displayed on the setup information screen 21. For example, if the image forming apparatus does not support color printing, the mobile terminal 10 may not display a color mode of the setup information screen 21 or may deactivate the color mode.

The mobile terminal 10 may store setup information entered through the UE interface 20 (See FIG. 7) in the UE storage unit 30 (See, for example, FIG. 7).

Thereafter, the mobile terminal 10 may transmit a setup change request to the image forming apparatus 100 through the UE communication unit 40 (See FIG. 7) in response to a user control command, and may transmit setup information stored in the UE storage unit 30 (See FIG. 7) to the image forming apparatus 100.

For example, if the mobile terminal 10 communicates with the image forming apparatus 100 through near field communication (NFC), the user moves the mobile terminal 10 closer to the image forming apparatus 100 (i.e., the user perform tagging), so that the mobile terminal 10 may transmit not only a request for changing setup information stored in the mobile terminal 10 but also change setup information stored in the mobile terminal 10 to the image forming apparatus 100.

The operations of the image forming apparatus having received the setup change request from the mobile terminal 10 are described in detail.

Figure 9:
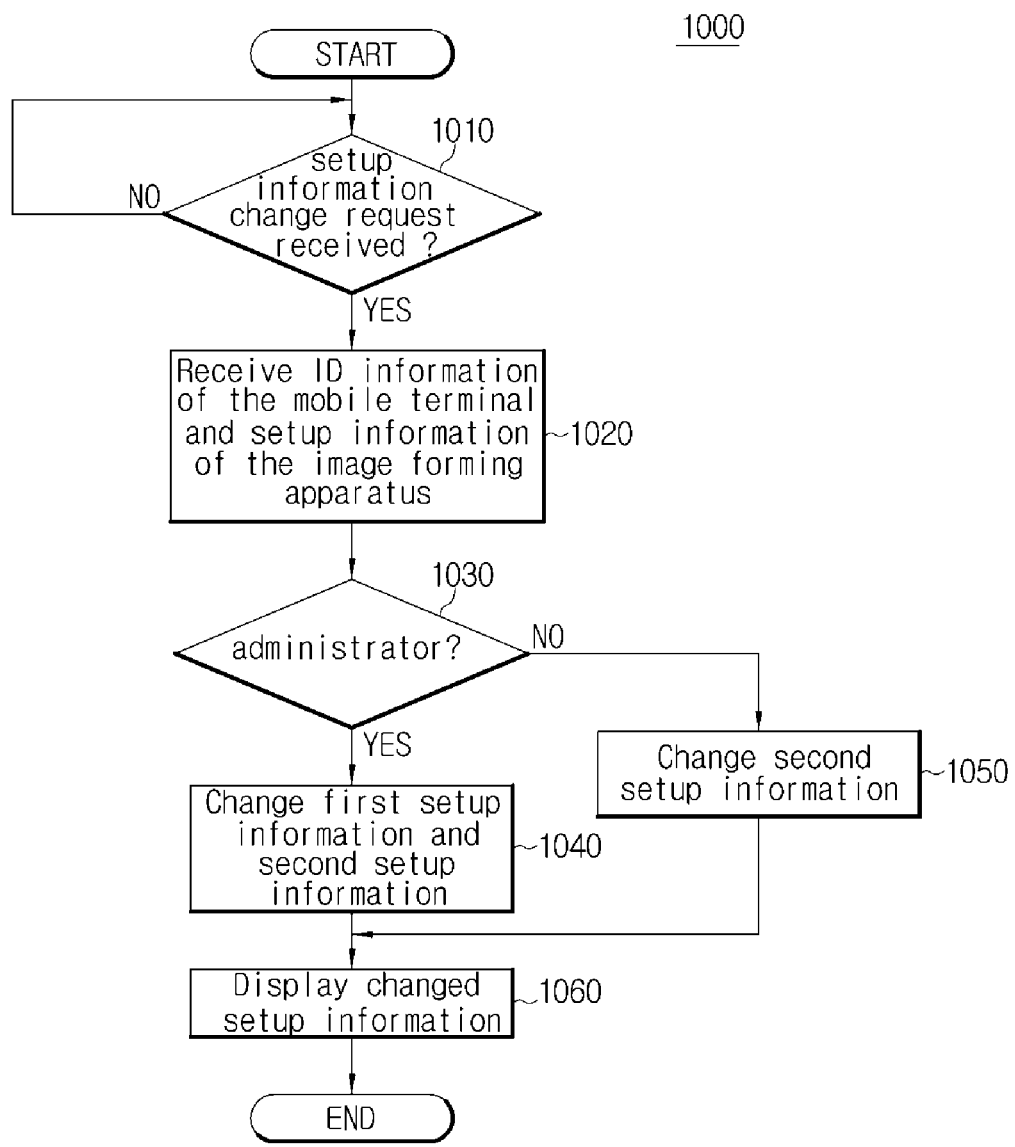
FIG. 9 is a flowchart illustrating the operation for changing setup information according to an exemplary embodiment of the disclosure.
Figure 10:
FIG. 10 illustrates an example for changing a display language according to the setup information change operation illustrated in FIG. 9.
Figure 10:
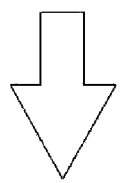
Figure 10:
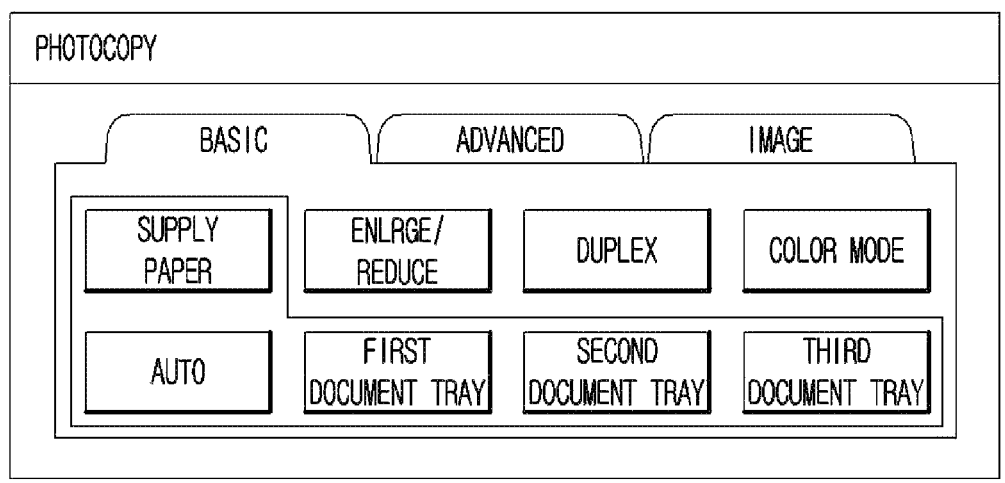

FIG. 9 is a flowchart illustrating the operation for changing setup information according to an exemplary embodiment of the disclosure. FIG. 10 illustrates an example for changing a display language according to the setup information change operation illustrated in FIG. 9.

Referring to FIG. 9, upon receiving a setup change request from the mobile terminal 10, the image forming apparatus 100 may perform the setup information change operation 1000 illustrated in FIG. 9.

The setup information change operation 1000 is described with reference to FIG. 9. The image forming apparatus 100 may determine whether to receive the setup change request from the mobile terminal 10 in step S1010.

For example, the user may perform tagging of the mobile terminal 10 to the image forming apparatus 100 so as to change setup information of the image forming apparatus 100. If the user performs tagging of the mobile terminal 10 to the image forming apparatus 100, the mobile terminal 10 may transmit a setup information change request to the image forming apparatus according to a communication scheme such as NFC.

Alternatively, if the user performs tagging of the mobile terminal 10 to the image forming apparatus 100, the mobile terminal 10 may acquire ID information and access information of the image forming apparatus 100, and may transmit a setup information change request to the image forming apparatus 100 using a WiFi communication scheme on the basis of the acquired ID information and access information.

Upon receiving the setup information change request in operation 1010, the image forming apparatus 100 may receive ID information of the mobile terminal 10 and setup information of the image forming apparatus 100 from the mobile terminal 100 in operation 1020.

Upon receiving a setup change request through the first communication module 610 (See, for example, FIG. 6) or upon receiving valid access information and setup change request through the second communication module 620 (See, for example, FIG. 6), the image forming apparatus determines that a valid user setup information change request has been received.

Upon receiving the valid user setup information change request, the image forming apparatus 100 may receive ID information of the mobile terminal 10 of the user and setup information of the image forming apparatus 100 through the first communication module 610 (See FIG. 6) or the second communication module 620 (See, for example, FIG. 6).

Thereafter, the image forming apparatus 100 may determine whether the user is an administrator in operation 1030.

The image forming apparatus may determine a user class (administrator or guest) on the basis of ID information of the mobile terminal 10.

The image forming apparatus 100 receives ID information of the mobile terminal 10 carried by the administrator and guest, and stores the received ID information in the storage unit 500 (See, for example, FIG. 5). The image forming apparatus 100 compares the pre-stored ID information with ID information received from the mobile terminal 10, and determines a user class according to the result of comparison.

If the user is determined to be an administrator in operation 1030, the image forming apparatus 100 changes the first setup information and the second setup information on the basis of setup information received from the mobile terminal 10 in operation 1040.

The image forming apparatus 100 stores first setup information 500 (See, for example, FIG. 5) from among the setup information received from the mobile terminal 10 in the first storage region 510 (See, for example, FIG. 5), and stores second setup information in the second storage region 520 (See, for example, FIG. 5).

For example, upon receiving setup information related to the country and the recording-medium size from the mobile terminal 10, the image forming apparatus 100 stores the country-related information in the first storage region 510 (See, for example, FIG. 5), and stores the recording-medium-size-related information in the second storage region 520 (See, for example, FIG. 5).

If the user is not identical to the administrator in operation 1030, the image forming apparatus 100 changes the second setup information on the basis of setup information received from the mobile terminal 10 in operation 1050.

The image forming apparatus 100 may store the second setup information from among the setup information received from the mobile terminal 10 in the second storage region 520 (See, for example, FIG. 5) of the storage unit 500 (See, for example, FIG. 5).

For example, upon receiving the setup information related to the country and the recording-medium size from the mobile terminal 10, the image forming apparatus stores the information related to the recording-medium size in the second storage region 520 (See, for example, FIG. 5) and does not store the country-related information therein.

Thereafter, the image forming apparatus 100 displays the changed setup information through the user interface 400 in operation 1060. The image forming apparatus 100 displays the resultant changed setup information on the basis of the changed setup information.

For example, if the user changes language-related setup information displayed on the user interface (UI) 400 to English, the image forming apparatus 100 may change language displayed on the user interface (UI) 400 such that the language of the user interface (UI) 400 is changed from Korean to English as illustrated in FIG. 10.

The image forming apparatus 100 may change language displayed on the user interface (UI) 400 from Korean to English as illustrated in FIG. 10.

In an example, if the user changes the recording-medium size from A4 (210 mm*297 mm) to B5 (176 mm*250 mm), the image forming apparatus 100 may change the recording-medium size to B5, and display the B5 size.

The user can change setup information of the image forming apparatus 100 using the mobile terminal 10, such that the user can conveniently change the setup information.

According to an exemplary embodiment, only an administrator user can change specific setup information acting as the principal parameters of the operations of the image forming apparatus 100, such that the important setup information cannot be arbitrarily changed to prevent a malfunction of the image forming apparatus 100.

Although the setup information change operation 1000 illustrated in FIG. 9 includes receiving not only setup information but also ID information of the mobile terminal 10 for convenience of description and better understanding of the disclosure, the scope or spirit of the disclosure is not limited thereto. For example, the image forming apparatus 100 may receive ID information of the mobile terminal 10 as well as the setup information change request.

Figure 11:
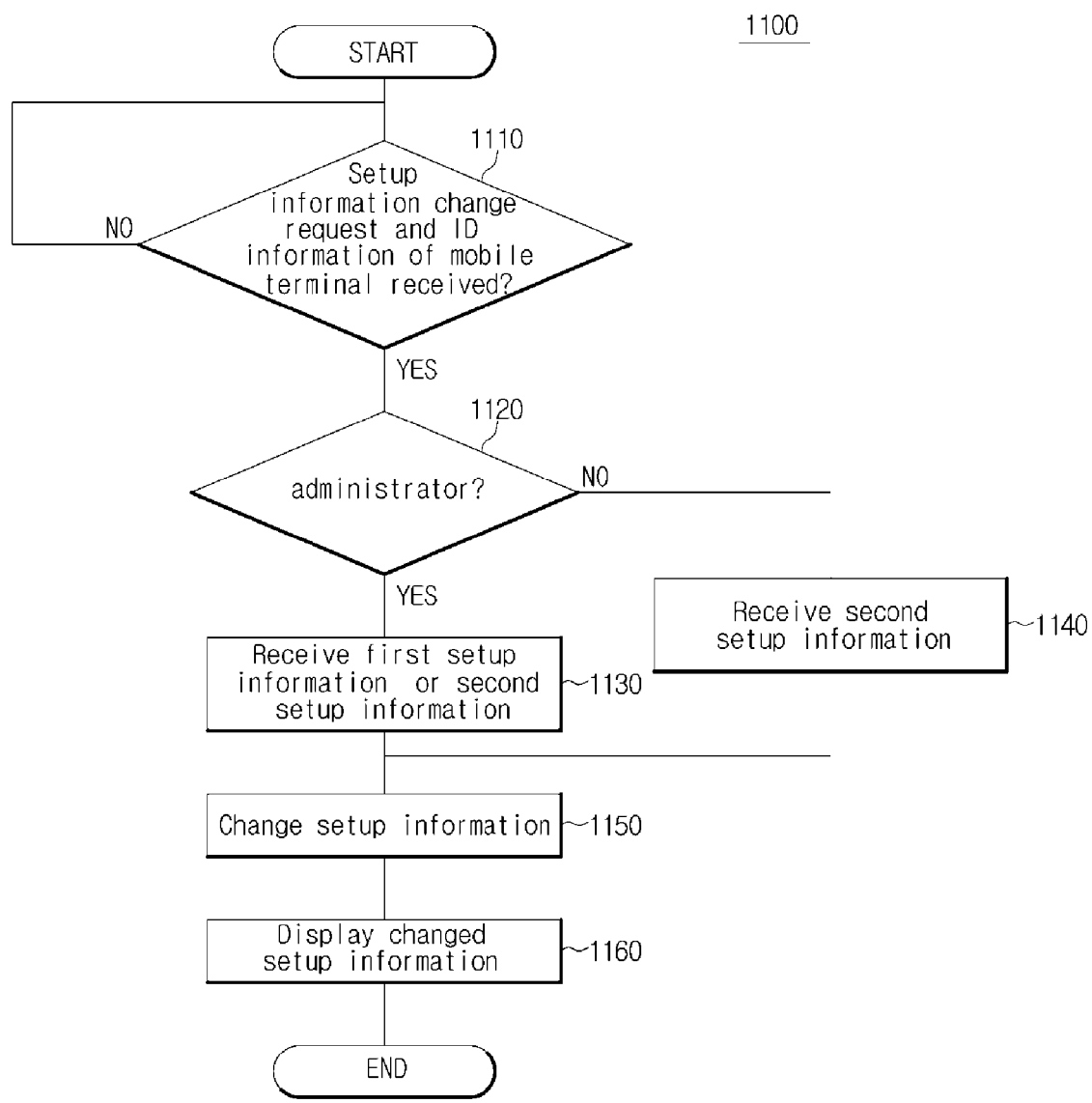
FIG. 11 is a flowchart illustrating an operation for changing setup information according to an embodiment of the disclosure.

FIG. 11 is a flowchart illustrating an operation for changing setup information according to an embodiment of the disclosure.

The setup information change operation 1100 according to an embodiment of the disclosure is described with reference to FIG. 11.

Referring to FIG. 11, the image forming apparatus determines that the setup information change request and ID information have been received from the mobile terminal 10 in operation 1110.

For example, the user performs tagging of the mobile terminal 10 to the image forming apparatus 100, so that the setup change request and ID information of the mobile terminal 10 can be applied to the image forming apparatus 100.

If the user performs tagging of the mobile terminal 10 to the image forming apparatus 100, the mobile terminal 10 may transmit the setup information change request and ID information of the mobile terminal 10 to the image forming apparatus 100 using the LAN direct communication scheme such as NFC.

Alternatively, when the user performs tagging of the mobile terminal 10 to the image forming apparatus 100, the mobile terminal 10 obtains ID information and access information of the image forming apparatus 100, and transmits the setup information change request and ID information of the mobile terminal 10 to the image forming apparatus 100 using the LAN communication scheme such as WiFi on the basis of the obtained ID information and access information.

Upon receiving the setup information change request and ID information of the mobile terminal 10 in operation 1110, the image forming apparatus 100 determines whether the user is an administrator in operation 1120. The image forming apparatus 100 may determine the user authority on the basis of ID information of the mobile terminal 10.

If the user is determined to be the administrator in operation 1120, the image forming apparatus 100 may receive the first setup information or the second setup information from the mobile terminal 10 in operation 1130.

The image forming apparatus may transmit the setup information transmission request related to the administrator class to the mobile terminal 10. The mobile terminal 10 having received the setup information transmission request of the administrator class may transmit the first setup information or the second setup information to the image forming apparatus 100.

If the user is not the administrator in operation 1120, the image forming apparatus 100 may receive the second setup information from the mobile terminal 10 in operation 1140.

The image forming apparatus 100 transmits the setup information transmission request of a guest class to the mobile terminal 10, and the mobile terminal 10 having received the guest-class setup information transmission request transmits the second setup information to the image forming apparatus 100.

Thereafter, the image forming apparatus 100 may change setup information stored in the storage unit 500 (See, for example, FIG. 2) on the basis of the received setup information in operation 1150. The image forming apparatus 100 may store the first setup information received from the mobile terminal 10 in the first storage region 510 (See FIG. 5), and may store the second setup information received from the mobile terminal 10 in the second storage region 520 (See, for example, FIG. 5).

Thereafter, the image forming apparatus 100 may display the changed setup information through the user interface (UI) 400 in operation 1160.

The image forming apparatus 100 may display the changed setup information on the basis of the changed setup information. For example, if the user changes setup information related to a language displayed on the UI 400 to English, the image forming apparatus 100 may change language displayed on the UI 400 to English.

In accordance with the setup information change operations (1000, 1100) illustrated in FIGS. 9 and 11, the image forming apparatus 100 may receive setup information from the mobile terminal 10 irrespective of types of the image forming apparatus 100. However, it may be difficult to establish some parts of the setup information received from the mobile terminal 10 according to types of the image forming apparatus 100.

For example, assuming that the image forming apparatus 100 provides a monochrome image only, although the image forming apparatus 100 receives setup information of a color mode, it may be difficult to apply the received color-mode setup information to the image forming apparatus 100.

The image forming apparatus 100 may receive only some setup information from among the setup information stored in the mobile terminal 10 according to types of the image forming apparatus 100.

Figure 12:
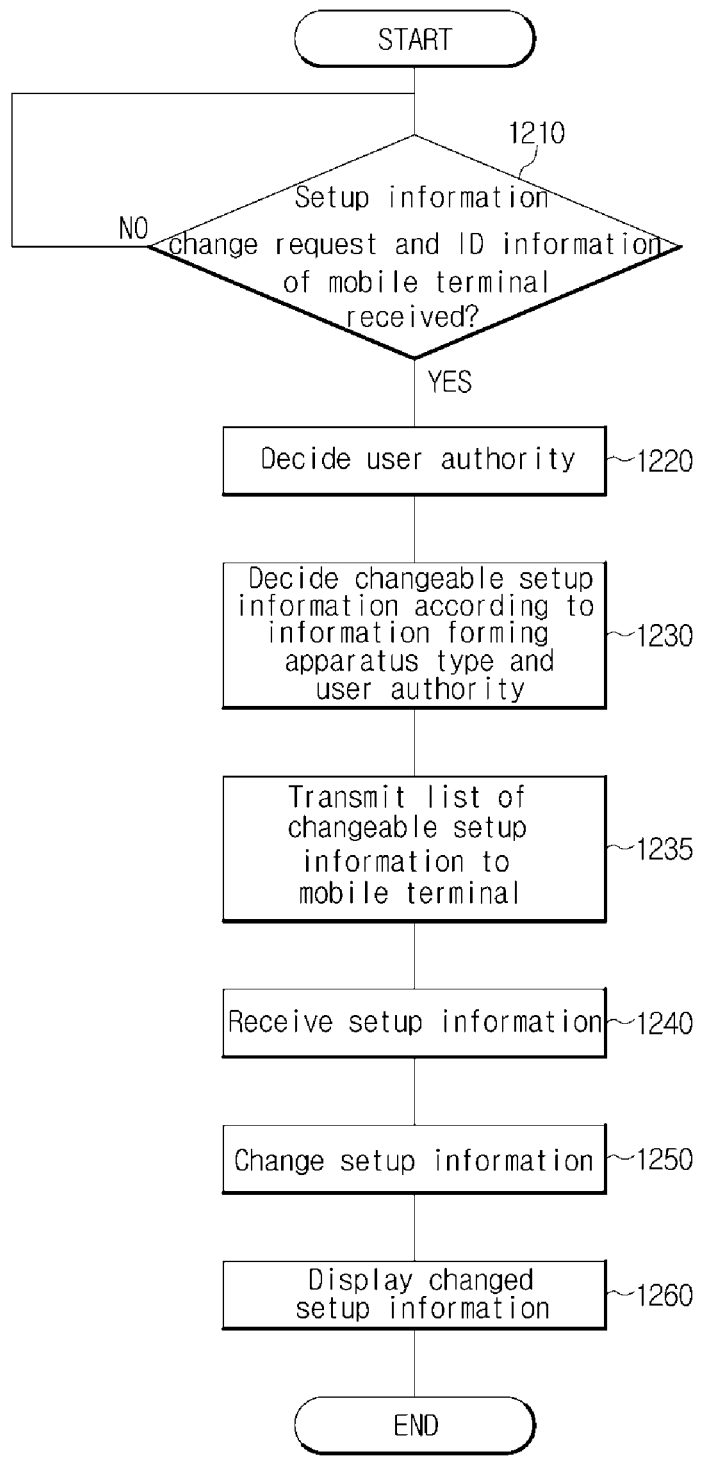
FIG. 12 is a flowchart illustrating an operation for changing setup information according to an embodiment of the disclosure.

FIG. 12 is a flowchart illustrating an operation for changing setup information according to an embodiment of the disclosure.

The setup information change operation 1200 according to an embodiment is described with reference to FIG. 12. The image forming apparatus 100 may determine whether the setup information change request of the mobile terminal 10 and ID information of the mobile terminal 10 have been received in operation 1210.

For example, the user performs tagging of the mobile terminal 10 to the image forming apparatus 100, so that the setup information change request and the ID information of the mobile terminal 10 can be applied to the image forming apparatus 100.

Upon receiving the setup information change request and the ID information of the mobile terminal 10 in operation 1210, the image forming apparatus 100 determines the user authority in operation 1220.

The image forming apparatus 100 may determine whether the user is an administrator or guest on the basis of the ID information of the mobile terminal 10.

Thereafter, the image forming apparatus may determine whether setup information can be changed according to a function of the image forming apparatus 100 and the user authority in operation 1230.

For example, if the user is in the administrator class and the image forming apparatus 100 provides color images, the user may change the first setup information such as data, time, country, etc. and the second setup information such as the recording-medium size, the recording-medium type, a color mode, etc.

In an example, if the user authority is in a guest class and the image forming apparatus 100 provides a monochrome image, only the second setup information such as the recording-medium size and the recording-medium type may be changed.

Thereafter, the image forming apparatus 100 may transmit the list of changeable setup information to the mobile terminal 10 in operation 1235. The image forming apparatus 100 may transmit not only the list of changeable setup information but also the changeable range of the setup information to the mobile terminal 10.

For example, if the image forming apparatus 100 supports the recording medium of A4 or less, the image forming apparatus 100 may transmit a command indicating that the recording-medium size can be changed to a maximum of A4 to the mobile terminal 10.

Thereafter, the image forming apparatus 100 may receive setup information from the mobile terminal 10 in operation 1240.

The mobile terminal 10 may transmit only setup information corresponding to the list of changeable setup information received from the image forming apparatus 100 to the image forming apparatus 100, and the image forming apparatus 100 may receive setup information that can be changed according to the user authority and function of the image forming apparatus 100.

Thereafter, the image forming apparatus 100 may change setup information stored in the storage unit 500 (See, for example, FIG. 2) on the basis of the received setup information in operation 1250. The image forming apparatus 100 may store the first setup information received from the mobile terminal 10 in the first storage region 510 (See, for example, FIG. 5) of the storage unit 500 (See, for example, FIG. 2), and may store the second setup information received from the mobile terminal 10 in the second storage region 520 (See, for example, FIG. 5).

Thereafter, the image forming apparatus 100 may display the changed setup information through the user interface (UI) 400 in operation 1260.

Figure 13:
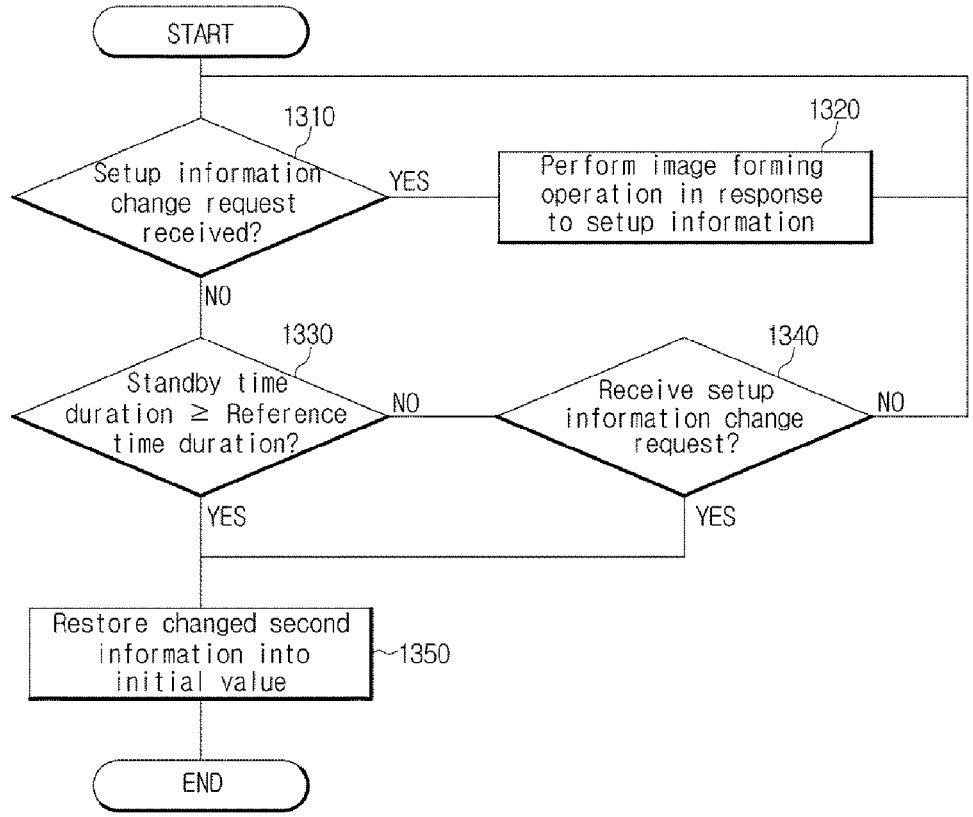
FIG. 13 is a flowchart illustrating a recovery operation of the setup information according to an exemplary embodiment of the disclosure.

FIG. 13 is a flowchart illustrating a recovery operation of the setup information according to an exemplary embodiment of the disclosure.

Referring to FIG. 13, if the image forming task in response to a user control command is completed, the image forming apparatus 100 may perform the setup information recovery operation 1300 capable of restoring setup information to an initial value, because an user determines that setup information of the image forming apparatus 100 indicates an initial value and the operation command is input to the image forming apparatus 100. In other words, if the setup information is not recovered, the image forming apparatus 100 may perform the image forming operation on the basis of incorrect setup information.

The setup information recovery operation 1300 is described with reference to FIG. 13. The image forming apparatus 100 determines whether the user inputs an operation command in operation 1310.

The image forming apparatus 100 may determine whether the user inputs an operation command (e.g., a command for starting the image forming operation) through the user interface 200 (See, for example, FIG. 2).

If the user operation command is entered in operation 1310, the image forming apparatus 100 may perform the image forming operation on the basis of the setup information stored in the storage unit 500 (See, for example, FIG. 2) in operation 1320. For example, the image forming apparatus 100 may obtain an image of the sheet of paper according to a color mode, a recording-medium size, a recording-medium type, an image tone, an image quality, etc. stored in the storage unit 500 (See, for example, FIG. 2), and may form an image corresponding to the sheet image on the recording medium.

If the user operation command is not entered in operation 1310, the image forming apparatus 100 may determine whether a standby time duration needed for waiting for the user operation command is equal to or higher than a reference time duration in operation 1330.

The standby time duration may be consumed when the user handles the UI 200 (See, for example, FIG. 2) of the image forming apparatus 100 so as to perform the image forming operation, and may be a duration during which the document or sheet of paper is located on the image acquisition unit 300 (See, for example, FIG. 2) and then the image forming apparatus 100 waits for the next handling (e.g., a copy command) of the user.

In addition, if an additional handling of the user does not occur during a reference time duration or longer, the image forming apparatus 100 may determine that the user has no intention to activate the image forming operation.

Therefore, the image forming apparatus 100 may determine whether or not the setup information is restored on the basis of specific information indicating whether the standby time duration is equal to or higher than a reference time duration.

If the standby time duration is equal to or longer than the reference time duration in operation 1330, the image forming apparatus 100 may change the changed second setup information to the initial value in operation 1350. In more detail, if the standby time duration is equal to or longer than the reference time duration, the image forming apparatus 100 may store the initial value of the setup information stored in the first storage region 510 (See, for example, FIG. 5) of the storage unit 500 (See FIG. 5) in the second storage region 520 (See, for example, FIG. 5).

For example, after the image forming apparatus 100 changes the recording-medium size from A4 to B4 according to the setup information change request of the user so as to perform the image forming operation, if an additional operation command is not entered during the reference time duration, the image forming apparatus 100 may restore the recording-medium size to the initial value, i.e., A4.

Although the image forming apparatus 100 can recover the second setup information, it can maintain the changed first setup information without change. The first setup information may be changed only by the administrator, and is used as the setup information indicating the principal parameters (e.g., data, time, country, etc.) related to the operations of the image forming apparatus 100. As a result, the first setup information can prevent information from being changed for a predetermined time unrecognized by the user (administrator).

In other words, if the second setup information is changed, the changed second setup information is restored to an initial value. However, if the first setup information is changed, it is impossible to recover the changed first setup information.

In addition, if the standby time duration is equal to or higher than the reference time duration in operation 1330, the image forming apparatus 100 determines whether the setup information change request is received in operation 1340. The image forming apparatus 100 may determine whether a new setup information change request is received through the communication unit 600 (See, for example, FIG. 2).

Upon receiving the setup information change request in operation 1340, the image forming apparatus 100 may change the changed second setup information to the initial value in operation 1350. In more detail, if the standby time duration is equal to or higher than the reference time duration, the image forming apparatus 100 may store the initial value of the setup information stored in the first storage region 510 (See, for example, FIG. 5) of the storage unit 500 (See FIG. 5) in the second storage region 520 (See, for example, FIG. 5).

If a new setup information change request is received before the changed setup information is recovered, the image forming apparatus 100 may restore the changed setup information to the initial value.

If the setup information change request is not received in operation 1340, the image forming apparatus 100 determines whether the operation command is input in operation 1310, and re-determines whether the standby time duration is equal to or higher than the reference time duration in operation 1330.

As described above, the changed second setup information may be recovered, so that the image forming apparatus 100 can perform the image forming operation on the basis of user-desired setup information even when many users commonly use the image forming apparatus 100.

The image forming apparatus and the method for forming the same according to the embodiments can receive setup information stored in a user's mobile terminal using LAN communication such as NFC, such that the user can easily and quickly change the setup information of the image forming apparatus.

In accordance with an aspect of the disclosure, according to the image forming apparatus and the method for controlling the same according to the disclosure, users may be classified into an administrator and a guest according to the user authority, the image forming apparatus prevents the principal setup information related to the image forming operation from being changed by a user (guest) who has an insufficient amount of knowledge related to the image forming apparatus, resulting in the prevention of a malfunction caused by change of the principal setup information.

Although a few embodiments of the disclosure have been illustrated and described, it would be appreciated by those skilled in the art that changes may be made in these embodiments without departing from the principles and spirit of the invention, the scope of which is defined in the claims and their equivalents.

What is claimed is:

1. An image forming apparatus comprising:
   a storage unit to include a first storage region storing first setup information and a second storage region storing second setup information;
   a communication unit to receive setup information and identifier (ID) information from a mobile terminal; and
   a controller to change at least one of the stored first setup information and the stored second setup information according to the received setup information when a user class is determined as a first class, and to change the stored second setup information according to the received setup information when the user class is determined as a second class, the user class determined on a basis of the ID information of the mobile terminal,
   wherein the first setup information includes at least one of date information, time information, and country information, and the second setup information includes at least one of display language information, recording-medium type information, recording-medium size information, image quality information, and image tone.

2. The image forming apparatus according to claim 1, wherein the first storage region includes a non-volatile memory, and the second storage region includes a volatile memory.

3. The image forming apparatus according to claim 1, wherein:
   if a control command is not entered by the user within a reference time duration after reception of the first or second setup information, the controller initializes the changed second setup information.

4. The image forming apparatus according to claim 1, wherein the communication unit includes:
a first communication module to directly communicate with the mobile terminal, and
a second communication module to communicate with the mobile terminal through a communication network.

5. The image forming apparatus according to claim 4, wherein:
if the mobile terminal is tagged, the first communication module receives at least one of ID information of the mobile terminal, the first setup information, and the second setup information.

6. The image forming apparatus according to claim 4, wherein:
if the mobile terminal is tagged, the first communication module transmits access information to the mobile terminal; and
if the mobile terminal connects to the communication network, the second communication module receives at least one of ID information of the mobile terminal, the first setup information, and the second setup information.

7. An image forming apparatus comprising:
a storage unit to store first and second setup information related to operations of the image forming apparatus therein;
a communication unit to communicate with a mobile terminal; and
a controller:
to determine user authority on a basis of identifier (ID) information of the mobile terminal,
to transmit a list of at least one of the first and second setup information to the mobile terminal according to the user authority, and
to change at least one of the first and second setup information according to setup information received from the mobile terminal,
wherein the first setup information includes at least one of date information, time information, and country information, and the second setup information includes at least one of display language information, recording-medium type information, recording-medium size information, image quality information, and image tone.

8. The image forming apparatus according to claim 7, wherein:
if the user authority indicates the administrator, the controller controls the communication unit to transmit a list of the first setup information and the second setup information to the mobile terminal.

9. The image forming apparatus according to claim 7, wherein:
if the user authority does not indicate the administrator, the controller controls the communication unit to transmit a list of the second setup information to the mobile terminal.

10. A method for controlling an image forming apparatus comprising:
receiving at least one of first setup information and second setup information from a mobile terminal;
determining a class of a user authority on a basis of identifier (ID) information of the mobile terminal;
storing at least one of the first setup information and the second setup information received from the mobile terminal when the user authority class is determined as a first class; and
storing the second setup information received from the mobile terminal when the user authority class is determined as a second class,
wherein the first setup information includes at least one of date information, time information, and country information, and the second setup information includes at least one of display language information, recording-medium type information, recording-medium size information, image quality information, and image tone.

11. The method according to claim 10, further comprising:
if a control command is not entered by the user within a reference time duration after reception of the first or second setup information, initializing the second setup information.

12. The method according to claim 10, wherein the receiving of the at least one setup information includes:
if the mobile terminal is tagged, receiving ID information of the mobile terminal, and at least one of the first setup information and the second setup information.

13. A method for controlling an image forming apparatus comprising:
receiving identifier (ID) information of a mobile terminal from the mobile terminal;
determining a user authority on the basis of identifier (ID) information of the mobile terminal;
transmitting a list of at least one of the first and second setup information to the mobile terminal according to the user authority; and
changing at least one of the first and second setup information according to the setup information received from the mobile terminal, and
wherein the first setup information includes at least one of date information, time information, and country information, and the second setup information includes at least one of display language information, recording-medium type information, recording-medium size information, image quality information, and image tone.

14. The method according to claim 13, wherein the transmitting of the changeable setup information to the mobile terminal includes:
if the user authority indicates an administrator, transmitting a list of first setup information and second setup information to the mobile terminal.

15. The method according to claim 13, wherein the transmitting of the changeable setup information to the mobile terminal includes:
if the user authority does not indicate the administrator, transmitting a list of the second setup information to the mobile terminal.

* * * * *